Sept. 1, 1925.  A. L. HELLER  1,552,156
BELT PLATE
Filed Feb. 25, 1925
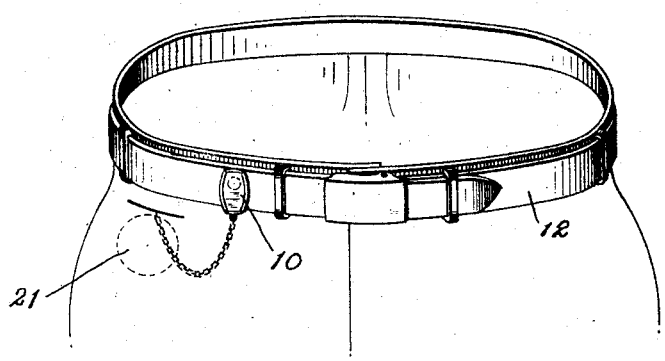
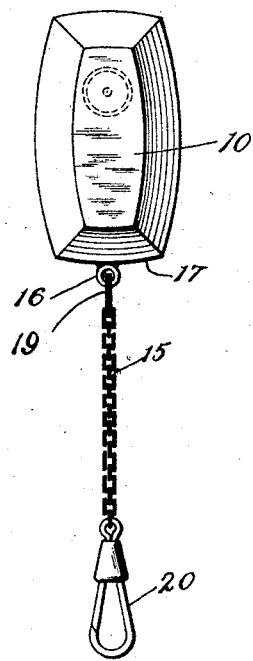
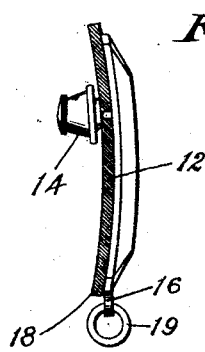
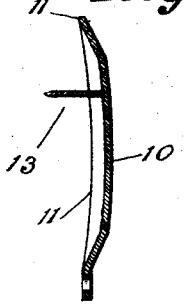
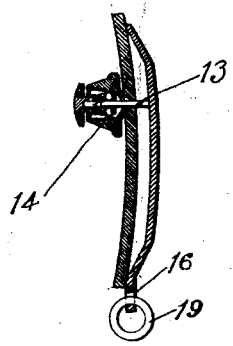
INVENTOR.
Albert L. Heller.
BY Barlow & Barlow
ATTORNEYS.

Patented Sept. 1, 1925.

1,552,156

UNITED STATES PATENT OFFICE.

ALBERT L. HELLER, OF CHICAGO, ILLINOIS, ASSIGNOR TO MORSE ANDREWS COMPANY, OF ATTLEBORO, MASSACHUSETTS, A CORPORATION OF MASSACHUSETTS.

BELT PLATE.

Application filed February 25, 1925. Serial No. 11,440.

*To all whom it may concern:*

Be it known that I, ALBERT L. HELLER, a citizen of the United States, residing at Chicago, in the county of Cook and State of Illinois, have invented certain new and useful Improvements in Belt Plates, of which the following is a specification.

This invention relates to an improvement in belt-attaching device; and has for its object to provide such a device which comprises a plate member having an inwardly-extendings spur adapted to pierce and extend through the body of the belt and to provide a clutch member for releasably gripping the spur on the inner side thereof to lock the plate to the outer surface of the belt, the plate being provided with an attaching chain at its lower edge.

With these and other objects in view, the invention consists of certain novel features of construction, as will be more fully described, and particularly pointed out in the appended claims.

In the accompanying drawings:—

Figure 1 is a perspective view illustrating my improved belt plate as connected to a belt and having the attaching chain connected to its lower end, which chain is shown as connected to a watch illustrated in dotted lines.

Figure 2 is an enlarged front view of my improved belt plate and attaching chain.

Figure 3 is a side elevation showing the belt in section and the spur of the plate as passing through the belt with the clutch connected to the inner end of the spur to lock the plate to the belt.

Figure 4 is a central sectional view of the plate and a sectional view of one form of clutch as connected to the spur to hold the plate against the outer surface of the belt, the belt being shown in section.

Figure 5 is a sectional elevation of my inproved belt plate with a spur projecting inwardly from the face thereof.

It is found in the use of belt plates of this character, that inasmuch as belts of a great variety of widths are being employed, of advantage to provide a belt-plate which is adapted to be connected to the belt and which is not dependent upon the width thereof, and, therefore, to obviate the difficulty of fitting such plates to belts of different widths, I have provided an ornamental front plate with a spur adapted to pierce and extend through to the opposite side of the belt to receive a clutch or other fastening device, by which means the plate is secured in the desired position to the outer face of the belt; and the following is a detailed description of the present embodiment of my invention and showing one means by which these advantageous results may be obtained.

With reference to the drawings, 10 designates the body of the plate which may be of any desired shape or size and of any suitable or ornamental design, but I preferably form this plate of concavo-convex shape or of such shape that its inner marginal edges 11 will contact with the front face 12 of the belt so as to provide sufficient frictional surface to hold the plate in set position when pressed against the front face of the belt. On the inner face of this plate and at a point above its center of gravity so that it will naturally hang in a vertical position, I have mounted a spur 13 which is adapted to pierce the belt and of a length to extend through the belt sufficiently to receive a clutch member 14 on its inner end whereby pressure of the clutch member against the inner surface of the belt serves to press the outer face of the belt slightly outwardly and cause it to conform more or less to the somewhat curved marginal engaging edges 11 of the plate, whereby sufficient frictional resistance is caused to maintain the plate in its vertical or set position; also by placing this spur at a point above the center of gravity of the plate the latter will naturally hang down in its proper position while suspended by its spur 13 which passes through the belt.

In order to facilitate the attaching of the end of a chain 15 to the lower edge of this belt-plate, I have provided an eye member 16 which extends a short distance below the lower edge 17 of this plate and in a plane parallel with the stock at the edge of the plate, which eye-member is adapted to project down below the lower edge 18 of the belt so as to permit the jump ring 19 of the chain 15 to extend through the eye in the plate at right angles thereto, whereby this jump ring will not interfere with the flat lying of the plate against the front surface of the belt and will be free to swing from the eye 16 thereof.

The opposite or free end of the chain 15 is provided with a snap 20 adapted to engage the ring of a watch 21, as illustrated in dotted lines in Figure 1, or to be connected to any other article such as keys or the like which may be desired to be carried about in the pocket of the wearer.

My improved belt plate is very practical in construction as it may be attached to belts of any width and owing to its extended frictional surface may be caused to remain in set position by a slight tension on the back thereof and also its extended front surface may be made very ornamental and attractive in appearance and owing to the particular construction and arrangement of its extended eye-member the attaching chain member may be applied thereto without interfering with the flat lying of the plate against the front surface of the belt.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A belt-plate having a spur extending inwardly from its inner surface and adapted to pierce and extend through a body belt, a spur gripping clutch member adjustable axially on said spur for binding the plate in fixed position to the outer surface of the belt, and a chain attached to the lower portion of the plate by means of which an article may be connected to the belt.

2. A belt-plate having an inwardly-extending spur secured to its rear surface at a point above its center of gravity, a clutch for releasably gripping the inner end of said spur to releasably secure the plate to the outer surface of a belt, and an eye member secured to the lower edge of said plate to which an attaching chain is connected.

3. A belt-plate of a substantial length to extend approximately across the width of the belt having rearwardly extending belt engaging marginal edges, a spur secured to the rear face of the plate at a point above its center of gravity and adapted to pierce and extend through the body belt, a clutch member for releasably gripping the inner end of said spur to slightly flex the belt and hold said marginal edges of the plate against the front surface thereof, and an eye member secured to the lower edge of said plate in a plane parallel with the edge of the plate and to extend beyond the lower edge of the plate and an attaching chain secured to said eye.

In testimony whereof I affix my signature.

ALBERT L. HELLER.